H. W. WATSON.
SPRING WHEEL.
APPLICATION FILED MAR. 30, 1918.

1,281,726.

Patented Oct. 15, 1918.
2 SHEETS—SHEET 1.

WITNESSES

INVENTOR
H. W. Watson
BY Victor J. Evans
ATTORNEY

H. W. WATSON.
SPRING WHEEL.
APPLICATION FILED MAR. 30, 1918.

1,281,726.

Patented Oct. 15, 1918.
2 SHEETS—SHEET 2.

WITNESSES
Paul M Hunt

INVENTOR
H. W. Watson.
BY Victor J. Evans
ATTORNEY

UNITED STATES PATENT OFFICE.

HARRY W. WATSON, OF MEMPHIS, TENNESSEE, ASSIGNOR OF ONE-HALF TO WILLIAM A. BELL, OF MEMPHIS, TENNESSEE.

SPRING-WHEEL.

1,281,726.　　　Specification of Letters Patent.　　Patented Oct. 15, 1918.

Application filed March 30, 1918. Serial No. 225,798.

*To all whom it may concern:*

Be it known that I, HARRY W. WATSON, a citizen of the United States, residing at Memphis, in the county of Shelby and State of Tennessee, have invented new and useful Improvements in Spring-Wheels, of which the following is a specification.

This invention relates to new and useful improvements in spring wheels particularly designed for use on automobiles and the principal object of the invention is to provide resilient supporting means for the tread portion of the wheel so as to render it unnecessary to use the well known pneumatic tires.

A further object of the invention is to make all the parts easily accessible and to provide means for removably securing said parts in position so that they may be readily replaced when broken or worn.

Another object of the invention is to provide a device of this character which is simple and durable in construction, reliable and efficient in operation and one which can be manufactured and placed upon the market at a minimum cost.

The invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1:
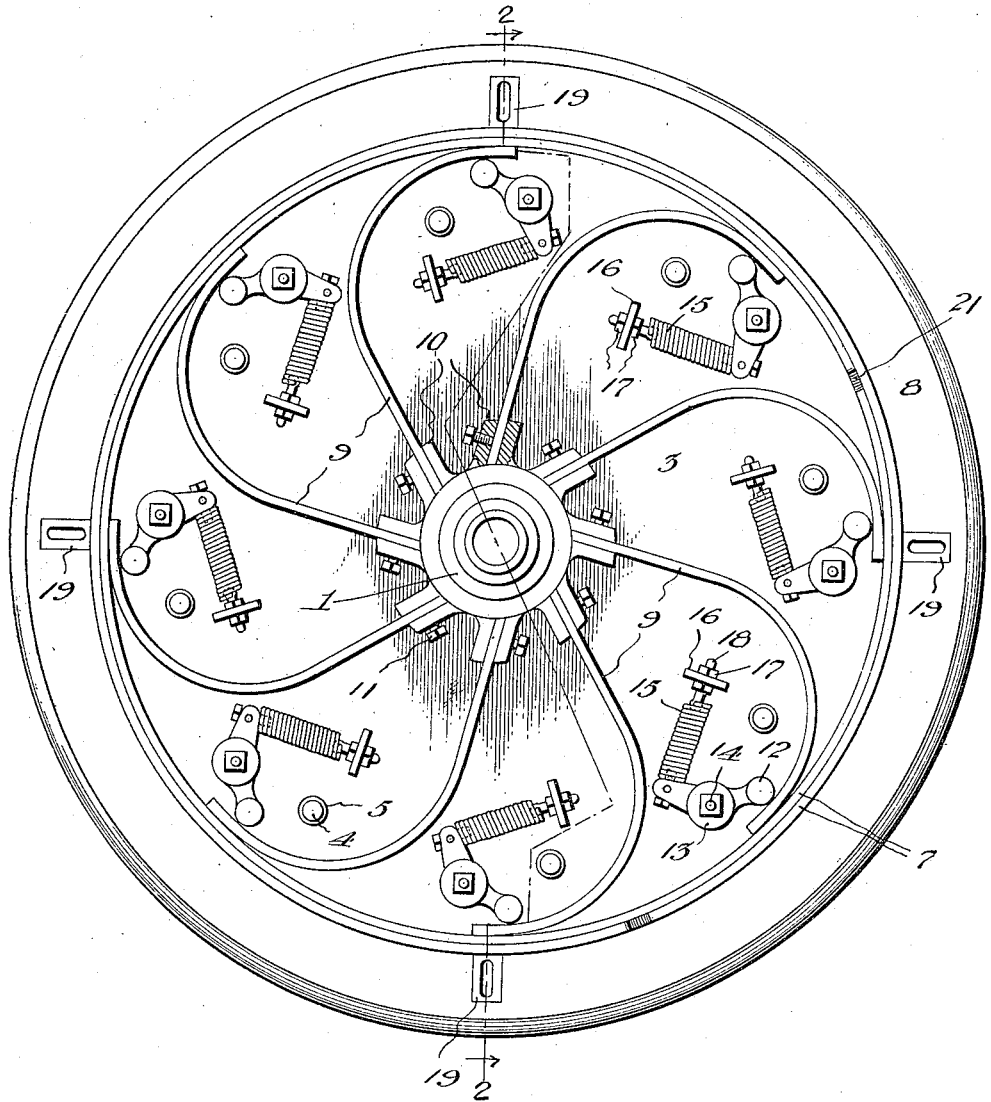
Figure 1 is an elevation of a wheel constructed in accordance with my invention and with one side thereof removed.
Figure 2:
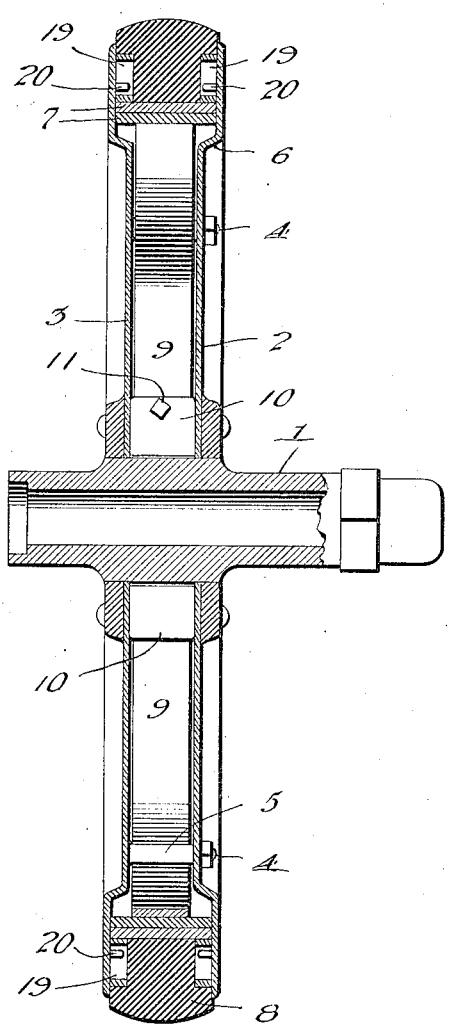
Fig. 2 is a sectional view on line 2—2 of Fig. 1.
Figure 3:
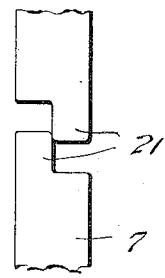
Figs. 3 and 4 are detail views.
Figure 4:
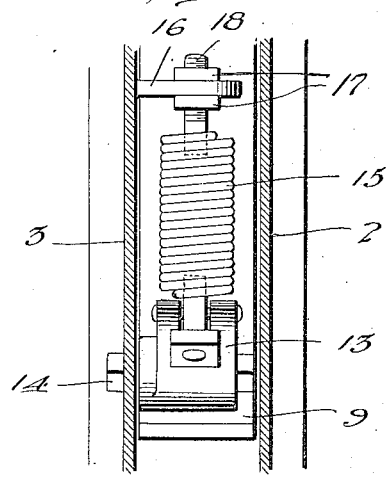

As shown in these views the wheel comprises the hub 1 to which is secured the circular plates 2 and 3. These plates are spaced apart and the outer edges are held in spaced relation by means of the bolts 4 provided with the sleeves 5. The outer edges of the plates flare outwardly as at 6 to provide a tire receiving space. In this space is located a pair of split spring rings 7, one placed on the other and the outermost one supporting the tire 8 which may be made of solid rubber or the like. The innermost ring is supported by means of a plurality of curved leaf springs 9 which have their inner ends engaging socket members 10 radiating from the hub and said springs are removably secured in said socket members by means of the screw bolts 11. The outer ends of the springs 9 are curved in such a manner that a portion of one face of each spring adjacent the end thereof will contact with the innermost ring as clearly shown in Fig. 1. The opposite face of this portion of each spring is engaged by a circular end 12 of a lever 13 pivoted to the plates by a bolt 14 which engages the enlarged central part of said lever. The circular part 12 is pressed against the end of the spring by means of a coil spring 15 connected with the opposite end of the lever and adjustably secured to a lug 16, carried by one of the plates, said spring being adjusted by means of the nuts 17 engaging with the screw threaded part 18 connected with the spring. In this manner the pressure of the end of the lever on the leaf spring may be adjusted. 19 indicates a series of slotted plates carried by the tire 8 in the slots of which engage pins 20 carried by the side plates. In this manner the tire is movably held to the plates. I prefer to form the meeting ends of each of the split rings with coöperating projections 21 so as to provide an overlapping joint for the rings.

It is thought the operation of the wheel will be clear from the above description. The tire has limited vertical movement between the plates but is held in its outer position by the leaf springs and the coil springs acting to expand the split rings and any tendency of the rim to move inwardly is resisted by these springs, thus a cushioning effect is secured which is substantially the same as if the automobile was mounted on a pneumatic tire. The resistance of these springs may be adjusted by means of the adjustability of the coil springs 15.

When it is desired to have access to any of the members of the wheel it is simply necessary to remove one of the side plates and thus expose all of the parts. I find it desirable to join the lugs on the inner plate so that the outer plate may be removed without interfering with the coil springs.

It is thought from the foregoing description that the advantages and novel features of my invention will be readily apparent.

I desire it to be understood that I may make such changes in the construction and in the combination and arrangement of the several parts, provided that such changes fall within the scope of the appended claims.

What I claim is:—

1. A spring wheel comprising a hub, a pair of circular plates secured thereto and spaced apart, a split ring within the space between said plates, spokes formed of leaf springs having their inner ends connected with the hub and their outer ends bearing against said split ring, means for adjusting the pressure of the outer ends of the springs against the ring, and a tire movably carried between the outer edges of the plates.

2. A spring wheel comprising a hub, a pair of circular plates connected therewith and spaced apart, split rings within said space adjacent the outer edges of the plates, a tire connected with the outermost ring, a plurality of spokes formed of leaf springs having their inner ends removably connected with the hub and having their outer ends curved and engaging with the inner one of the split rings, and means for adjusting the pressure of the outer ends of the springs against the rings.

3. A spring wheel comprising a hub, side plates connected therewith, leaf springs connected with the hub and located between the side plates, split rings engaging with the outer ends of said leaf springs, a tire seated on the outermost ring, pivoted levers each having one end bearing against the outer end of a leaf spring, a coil spring connected with the other end of the lever, and means for adjusting said spring.

In testimony whereof I affix my signature.

HARRY W. WATSON.